(12) United States Patent
Ohmi et al.

(10) Patent No.: US 6,804,285 B2
(45) Date of Patent: Oct. 12, 2004

(54) GAS SUPPLY PATH STRUCTURE FOR A GAS LASER

(75) Inventors: Tadahiro Ohmi, Sendai (JP); Hiroshi Osawa, Utsunomiya (JP); Nobuyoshi Tanaka, Tokyo (JP); Kazuhide Ino, Kyoto (JP); Toshikuni Shinohara, Sendai (JP); Yasuyuki Shirai, Sendai (JP); Masaki Hirayama, Sendai (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/425,015

(22) Filed: Oct. 25, 1999

(65) Prior Publication Data

US 2003/0058912 A1 Mar. 27, 2003

(30) Foreign Application Priority Data

Oct. 29, 1998 (JP) ............................................. 10-308690

(51) Int. Cl.[7] ........................... H01S 3/22; H01S 3/223; H01S 3/03
(52) U.S. Cl. ............................. 372/58; 372/57; 372/61
(58) Field of Search ................................ 372/55–65, 90

(56) References Cited

U.S. PATENT DOCUMENTS

| 3,402,364 A | | 9/1968 | De Lang | 331/94.5 |
| 3,404,349 A | | 10/1968 | Rigrod | 331/94.5 |
| 3,611,395 A | | 10/1971 | Carberry | 343/762 |
| 4,005,374 A | * | 1/1977 | Levatter et al. | 372/90 |

(List continued on next page.)

FOREIGN PATENT DOCUMENTS

| EP | 0472727 | 5/1990 | ......... H01S/3/1055 |
| GB | 1128162 | 9/1968 | |
| JP | 64-68984 | 3/1989 | |
| JP | 2-241074 | 9/1990 | |
| JP | 4-032281 | 2/1992 | |
| JP | 08-83945 | 3/1996 | |
| WO | 88/07272 | 9/1988 | ........... H01S/3/097 |
| WO | 90/13160 | 11/1990 | ......... H01S/3/0975 |

OTHER PUBLICATIONS

A.H. Shapiro "The Dynamics and Thermodynamics of Compressible Fluid Flow: Isentropic Flow", *Ronald Press*, 1954; pp. 73–111 (chapter 4).

M.A. Saad, "Compressible Fluid Flow", *Prentice–Hall*, 1993; pp. 87–137 (chapter 3).

*Primary Examiner*—David Porta
*Assistant Examiner*—Davienne Monbleau
(74) *Attorney, Agent, or Firm*—Fitzpatrick, Cella, Harper & Scinto

(57) ABSTRACT

A gas supply path structure forms a fluid path for allowing a laser gas to flow into or out of a pair of fluid inlet and outlet 11a and a laser gas is controlled to a predetermined subsonic speed at a throat portion. Gas supplies for controlling the speed of the gas are connected each to the fluid inlet and to the fluid outlet of the gas supply path structure and, together with a cooling device, compose a circulation system for controlling the speed and pressure of the laser gas at the fluid inlet and/or at the fluid outlet.

24 Claims, 13 Drawing Sheets

U.S. PATENT DOCUMENTS

| | | | | |
|---|---|---|---|---|
| 4,317,087 A | * | 2/1982 | Sander et al. | 372/57 |
| 4,413,345 A | * | 11/1983 | Altmann | 372/90 |
| 4,414,488 A | * | 11/1983 | Hoffmann et al. | 315/39 |
| 4,457,000 A | | 6/1984 | Rao | 372/58 |
| 4,606,030 A | | 8/1986 | Berkowitz | 372/5 |
| 4,802,183 A | | 1/1989 | Harris et al. | 372/57 |
| 4,911,805 A | * | 3/1990 | Ando et al. | 204/164 |
| 4,955,035 A | | 9/1990 | Gekat | 372/82 |
| 5,009,963 A | | 4/1991 | Ohmi et al. | 428/472.2 |
| 5,017,499 A | | 5/1991 | Hakuta et al. | 436/124 |
| 5,050,181 A | * | 9/1991 | Gekat | 372/69 |
| 5,142,132 A | | 8/1992 | MacDonald | 250/201.9 |
| 5,206,876 A | * | 4/1993 | von Buelow et al. | 372/90 |
| 5,255,282 A | | 10/1993 | Remo | 372/57 |
| 5,347,530 A | | 9/1994 | Gekat et al. | |
| 5,373,523 A | * | 12/1994 | Fujimoto et al. | 372/59 |
| 5,379,317 A | | 1/1995 | Bridges et al. | 372/64 |
| 5,440,578 A | | 8/1995 | Sandstrom | 372/57 |
| 5,450,436 A | | 9/1995 | Mizoguchi et al. | 372/57 |
| 5,642,374 A | | 6/1997 | Wakabayashi et al. | 372/57 |
| 5,682,400 A | | 10/1997 | Krasnov | 372/82 |
| 5,698,036 A | * | 12/1997 | Ishii et al. | 118/723 |
| 5,706,305 A | * | 1/1998 | Yamane et al. | 372/82 |
| 5,748,656 A | | 5/1998 | Watson et al. | 372/57 |
| 5,781,579 A | * | 7/1998 | Choo et al. | 372/64 |
| 5,835,520 A | | 11/1998 | Das et al. | 372/57 |
| 5,850,309 A | | 12/1998 | Shirai et al. | 359/360 |
| 6,198,762 B1 | * | 3/2001 | Krasnov | 372/87 |
| 6,212,211 B1 | * | 4/2001 | Azzola et al. | 372/33 |
| 6,259,716 B1 | * | 7/2001 | Iwasaki et al. | 372/82 |
| 6,331,994 B1 | | 12/2001 | Ohmi et al. | 372/82 |

* cited by examiner

FIG. 6

A — DECREASE OF CROSS-SECTIONAL AREA

| VARIATION OF CROSS SECTION | CASE OF SUBSONIC SPEED | CASE OF SUPERSONIC SPEED |
|---|---|---|
| GAS VELOCITY | INCREASE | DECREASE |
| MACH NUMBER | INCREASE | DECREASE |
| PRESSURE | DECREASE | INCREASE |
| DENSITY | DECREASE | INCREASE |
| TEMPERATURE | DECREASE | INCREASE |
| SOUND SPEED | DECREASE | INCREASE |

B — INCREASE OF CROSS-SECTIONAL AREA

| VARIATION OF CROSS SECTION | CASE OF SUBSONIC SPEED | CASE OF SUPERSONIC SPEED |
|---|---|---|
| GAS VELOCITY | DECREASE | INCREASE |
| MACH NUMBER | DECREASE | INCREASE |
| PRESSURE | INCREASE | DECREASE |
| DENSITY | INCREASE | DECREASE |
| TEMPERATURE | INCREASE | DECREASE |
| SOUND SPEED | INCREASE | DECREASE |

GAS TEMPERATURE AT FLUID INLET : 25°C
AT THROAT PORTION : −30.3°C
AT FLUID OUTLET : 16.9°C

FIG. 12

| HEAT TRANSFER | A HEATING | | B COOLING | |
|---|---|---|---|---|
| | CASE OF SUBSONIC SPEED | CASE OF SUPERSONIC SPEED | CASE OF SUBSONIC SPEED | CASE OF SUPERSONIC SPEED |
| GAS VELOCITY | INCREASE | DECREASE | DECREASE | INCREASE |
| MACH NUMBER | INCREASE | DECREASE | DECREASE | INCREASE |
| PRESSURE | DECREASE | INCREASE | INCREASE | DECREASE |
| DENSITY | DECREASE | INCREASE | INCREASE | DECREASE |
| TEMPERATURE | $M < \gamma^{-1/2}$ INCREASE / $\gamma^{-1/2} < M$ DECREASE | INCREASE | $M < \gamma^{-1/2}$ DECREASE / $\gamma^{-1/2} < M$ INCREASE | DECREASE |
| TOTAL PRESSURE | DECREASE | DECREASE | INCREASE | INCREASE |
| TOTAL TEMPERATURE | INCREASE | INCREASE | DECREASE | DECREASE |

$\gamma^{-1/2}$ 0.775 : MONOATOMIC MOLECULE
0.845 : DIATOMIC MOLECULE

GAS SUPPLY PATH STRUCTURE FOR A GAS LASER

BACKGROUND OF THE INVENTION

1. Field of the Invention

The present invention relates to a gas supply path structure and a gas supply method adapted in such a way that a fluid path is formed for a compressible fluid (mainly, compressible gas) to flow into or out of the path and that the fluid is ejected from a predetermined portion midway of the fluid path and, particularly, this gas supply path structure is suitably applicable to a laser oscillating apparatus using it for supply of a laser gas, an exposure apparatus having the laser oscillating apparatus as a component, and a device production method therewith.

2. Related Background Art

In recent years so-called excimer lasers are drawing attention as high output lasers only which can be oscillated in the ultraviolet region, and they are expected to be applied in the electronics industries, chemical industries, energy industries, etc., specifically, to processing, chemical reaction, etc. of metal, resin, glass, ceramics, semiconductors, and so on.

The functional principles of excimer laser oscillating apparatus will be described. First, a laser gas of Ar, Kr, Ne, $F_2$, He, Xe, $Cl_2$, or the like filled in a laser tube is brought into an excited state by electron beam irradiation, discharge, or the like. In the case of the KrF excimer laser, for example, the excited F atoms are coupled with inactive Kr atoms being in the ground state to create KrF, which is molecules existing only in the excited state. These molecules are called excimers. The excimers are instable and soon emit ultraviolet light to fall into the ground state. This phenomenon is called spontaneous emission and the excimer laser oscillating apparatus is one making use thereof so as to amplify the emitted light into phase-aligned light in an optical resonator composed of a pair of reflectors and take it out in the form of a laser beam.

The excimer laser oscillating apparatus is becoming the mainstream of light sources used in various modern industries on one hand and has the problem of extremely short light emission time due to exhaustion of the laser gas with light emission on the other hand. Namely, particularly in the case of the KrF laser, the ArF laser, and the $F_2$ laser among the excimer lasers, it is not easy to maintain the light emission over a long time, because a relatively long time is necessary for return from the state of light emission of the excited molecules to the original state of $F_2$ molecules.

In order to extend the light emission time by replenishment with the laser gas, it is necessary to always supply the laser gas at high speed. Generation of gas flow at high speed, however, can result in forming a shock wave, which could cause incapability of functioning as a laser oscillating apparatus; specifically, it could cause an offset of the optical axis of laser, loosening of joints for the laser gas, breakage of ceramics, metal fatigue, and so on. For example, when exposure or the like is carried out, vibration caused by the shock wave will be fatal disturbance rather than the above.

SUMMARY OF THE INVENTION

The present invention has been accomplished in view of the above problem and an object of the present invention is to provide a gas supply path structure (and a gas supply method) that can suppress occurrence of the shock wave while forming the gas flow at high speed close to the speed of sound in simple structure. A further object of the present invention is to provide a laser oscillating apparatus with long emission time equipped with the gas supply path structure, an exposure apparatus with high performance equipped with the laser oscillating apparatus, and a method for producing a high-quality device by use of the exposure apparatus.

A compressible fluid supply path structure according to the present invention is a compressible fluid supply path structure, said compressible fluid supply path structure being of a convergent-divergent nozzle type, said compressible fluid supply path structure comprising:

a fluid inlet into which a compressible fluid is made to flow;

a throat portion for controlling said compressible fluid to a speed less than a speed of sound;

a fluid outlet of which said compressible fluid is made to flow out; and a circulation system for circulating said compressible fluid flowing out of said fluid outlet into said fluid inlet.

The compressible fluid supply path structure may be constructed in either one of the following configurations:

a ratio of a pressure at said fluid inlet to a pressure at said fluid outlet is not less than a ratio of critical pressures;

the compressible fluid supply path structure is shaped so as to decrease disturbance caused by said compressible fluid;

the compressible fluid supply path structure is a structure without an inflection point;

the compressible fluid supply path structure further comprises at least one pressure correcting means for correcting a pressure at said fluid inlet or at said fluid outlet;

the correction for the pressure by said pressure correcting means is carried out near said fluid inlet;

the compressible fluid supply path structure further comprises at least one temperature correcting means for correcting a temperature at said fluid inlet or at said fluid outlet;

said temperature correcting means has a cooling function and said cooling is effected near said fluid outlet;

the compressible fluid supply path structure further comprises vertical width adjusting means for adjusting a vertical width of said throat portion;

the compressible fluid supply path structure is symmetric with respect to said throat portion at the center.

Another compressible fluid supply path structure according to the present invention is a compressible fluid supply path structure comprising:

a fluid inlet into which a compressible fluid is made to flow;

a predetermined portion for controlling said compressible fluid to a speed less than a speed of sound;

a fluid outlet of which said compressible fluid is made to flow out;

at least one temperature correcting means for correcting a temperature at said fluid inlet or at said fluid outlet; and a circulation system for circulating said compressible fluid flowing out of said fluid outlet into said fluid inlet.

The above compressible fluid supply path structure may be constructed so that said temperature correcting means has a cooling function and so that said cooling is effected near said fluid outlet.

A compressible fluid supply method according to the present invention is a compressible fluid supply method comprising:

a step of making a compressible fluid flow into a fluid inlet of a compressible fluid supply path structure of a convergent-divergent nozzle type;

a step of controlling said compressible fluid to a speed less than a speed of sound, at a throat portion of said compressible fluid supply path structure;

a step of making said compressible fluid flow out of a fluid outlet of said compressible fluid supply path structure; and a circulation step of circulating said compressible fluid flowing out of said fluid outlet, into said fluid inlet by a circulation system.

In the above compressible fluid supply method, said compressible fluid supply path structure may be arranged so that a ratio of a pressure at said fluid inlet to a pressure at said fluid outlet is not less than a ratio of critical pressures.

Another compressible fluid supply method according to the present invention is a compressible fluid supply method comprising:

a step of making a compressible fluid flow into a fluid inlet of a compressible fluid supply path structure;

a step of controlling said compressible fluid to a speed less than a speed of sound, at a predetermined portion of said compressible fluid supply path structure;

a step of making said compressible fluid flow out of a fluid outlet of said compressible fluid supply path structure;

a step of correcting at least one of temperatures at said fluid inlet and at said fluid outlet by temperature correcting means of said compressible fluid supply path structure; and a circulation step of circulating said compressible fluid flowing out of said fluid outlet, into said fluid inlet by a circulation system.

In the above compressible fluid supply method, said temperature correcting means may have a cooling function and said cooling may be effected near said fluid outlet.

A laser oscillating apparatus according to the present invention is a laser oscillating apparatus comprising:

a gas supply path structure for supplying a laser gas, said gas supply path structure being of a convergent-divergent nozzle type, said gas supply path structure comprising:
a fluid inlet into which said laser gas is made to flow;
a throat portion for controlling said laser gas to a speed less than a speed of sound; and
a fluid outlet of which said laser gas is made to flow out.

The laser oscillating apparatus may be constructed in either one of the following configurations:

said gas supply path structure further comprises a circulation system for circulating said laser gas flowing out of said fluid outlet, into said fluid inlet;

said gas supply path structure is arranged so that a ratio of a pressure at said fluid inlet to a pressure at said fluid outlet is not less than a ratio of critical pressures;

said laser gas is an excimer laser gas which is a mixture of $F_2$ gas with at least one inert gas selected from Kr, Ar, Ne, and He;

said gas supply path structure is a structure without an inflection point;

said gas supply path structure further comprises at least one pressure correcting means for correcting a pressure at said fluid inlet or at said fluid outlet;

said gas supply path structure further comprises at least one temperature correcting means for correcting a temperature at said fluid inlet or at said fluid outlet;

said temperature correcting means has a cooling function and said cooling is effected near said fluid outlet;

said gas supply path structure further comprises vertical width adjusting means for adjusting a vertical width of said throat portion;

said circulation system is comprised of at least one bellows pump;

said circulation system is comprised of at least one circulating pump;

said circulation system is comprised of at least one blower;

said circulation system is comprised of at least one Sirocco fan.

Another laser oscillating apparatus according to the present invention is a laser oscillating apparatus comprising:

a gas supply path structure group for supplying a laser gas, said gas supply path structure group being of a shape of gas supply path structures of a convergent-divergent nozzle type connected in series, said gas supply path structure group comprising:
a fluid inlet into which said laser gas is made to flow;
a central part for controlling said laser gas to a speed greater than a speed of sound; and
a fluid outlet of which said laser gas is made to flow out.

The above laser oscillating apparatus may be constructed in either one of the following configurations:

said gas supply path structure group further comprises a circulation system for circulating said laser gas flowing out of said fluid outlet, into said fluid inlet;

said laser gas is an excimer laser gas which is a mixture of $F_2$ gas with at least one inert gas selected from Kr, Ar, Ne, and He;

said gas supply path structure group is a structure without an inflection point;

said gas supply path structure group further comprises at least one pressure correcting means for correcting a pressure at said fluid inlet or at said fluid outlet said gas supply path structure group further comprises at least one temperature correcting means for correcting a temperature at said fluid inlet or at said fluid outlet;

said gas supply path structure group further comprises vertical width adjusting means for adjusting a vertical width of said central portion;

said circulation system is comprised of at least one bellows pump;

said circulation system is comprised of at least one circulating pump;

said circulation system is comprised of at least one blower;

said circulation system is comprised of at least one Sirocco fan.

An exposure apparatus according to the present invention is an exposure apparatus comprising:

a laser oscillating apparatus, said laser oscillating apparatus generating illumination light, said laser oscillating apparatus comprising a gas supply path structure for supplying a laser gas, said gas supply path structure being of a convergent-divergent nozzle type, said gas supply path structure comprising:
a fluid inlet into which said laser gas is made to flow;
a throat portion for controlling said laser gas to a speed less than a speed of sound; and a fluid outlet of which said laser gas is made to flow out, a first optical system for radiating said illumination light from said laser oscillating apparatus onto a reticle in which a predetermined pattern is formed; and a second optical system for radiating said illumination light having passed through said reticle, onto a surface to be irradiated.

Another exposure apparatus according to the present invention is an exposure apparatus comprising:

a laser oscillating apparatus, said laser oscillating apparatus generating illumination light, said laser oscillating apparatus comprising a gas supply path structure group for supplying a laser gas, said gas supply path structure group being of a shape comprised of gas supply path structures of a convergent-divergent nozzle type connected in series, said gas supply path structure group comprising:
a fluid inlet into which said laser gas is made to flow;
a central part for controlling said laser gas to a speed greater than a sound speed; and
a fluid outlet of which said laser gas is made to flow out, a first optical system for radiating said illumination light from said laser oscillating apparatus onto a reticle in which a predetermined pattern is formed; and a second optical system for radiating said illumination light having passed through said reticle, onto a surface to be irradiated.

A device production method according to the present invention is a method for producing a device, said method comprising:

a step of coating a surface to be irradiated, with a photosensitive material;

a step of effecting exposure of a predetermined pattern in said surface to be irradiated, coated with said photosensitive material, using the exposure apparatus as stated above; and a step of developing said photosensitive material on said surface after the exposure.

The above device production method may be arranged so that said surface to be irradiated is a wafer surface and so that a semiconductor element is formed on said wafer surface.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a diagram to show the relation of conditions to gas velocity, Mach number, gas pressure, gas density, gas temperature, and sound speed at each of portions (fluid inlet, throat portion, fluid outlet) of the gas supply path structure;

FIG. 12 is a diagram to show the relation of conditions to gas velocity, Mach number, gas pressure, gas density, gas temperature, and speed of sound at each of the portions (fluid inlet, light emission portion, fluid outlet) of the gas supply path structure;

DETAILED DESCRIPTION OF THE PREFERRED EMBODIMENTS

Some specific embodiments as application of the present invention will be described in detail by reference to the drawings.

(First Embodiment)

The first embodiment will be described first. The present embodiment is an example of the excimer laser oscillating apparatus which emits the so-called excimer laser light.

FIGS. 1, 2A, 2B and 3 are schematic diagrams to show the principal structure of the excimer laser oscillating apparatus according to the present embodiment.

This excimer laser oscillating apparatus, as illustrated in FIGS. 1, 2A, 2B and 3, is comprised of a laser chamber 1 to which an excimer laser gas is supplied and which emits the laser light by exciting the laser gas by discharge and resonating it, gas supply means 2 for supplying the laser gas to the laser chamber 1, and a cooling device 3 for cooling the laser gas heated. In the present example the laser chamber 1 is symmetric between the inlet and the outlet of gas, with consideration to alternate change of flowing directions of the laser gas as described hereinafter.

Figure 1:
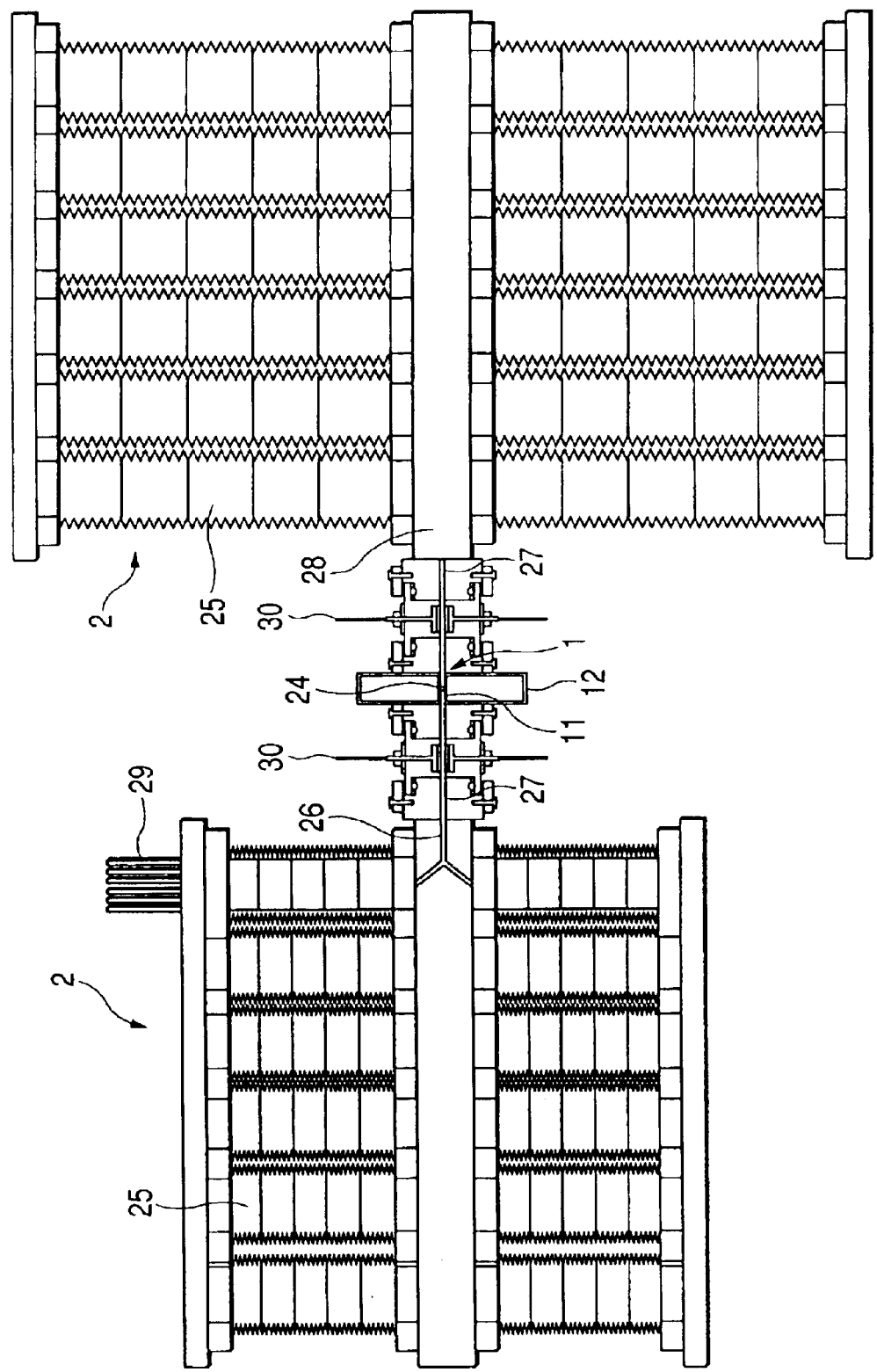
FIG. 1 is a schematic diagram to show the principal structure of the excimer laser oscillating apparatus according to the first embodiment.

Cooling of the laser gas is effected by supply of cooling water to gas feed frame 28 of FIG. 1 and by provision of radiation fins 29 in the gas supply means 2. The cooling device 3 does not have to be provided separately, if a rise of temperature of the laser gas is relatively small.

The excimer laser gas as a raw material in generation of the excimer laser light is a mixture gas of $F_2$ gas and at least one inert gas selected from Kr, Ar, Ne, and He. Appropriate gas species may be selected and combined out of these species, depending upon a wavelength desired to use. For example, KrF is preferable in the case of generation of the laser light at the wavelength of 248 nm, ArF in the case of the wavelength of 193 nm, and $F_2$ in the case of the wavelength of 157 nm. Further, $Kr_2$ is preferable in the case of the wavelength of 147 nm, ArKr in the case of the wavelength of 134 nm, and $Ar_2$ in the case of the wavelength of 126 nm.

Figure 2A:
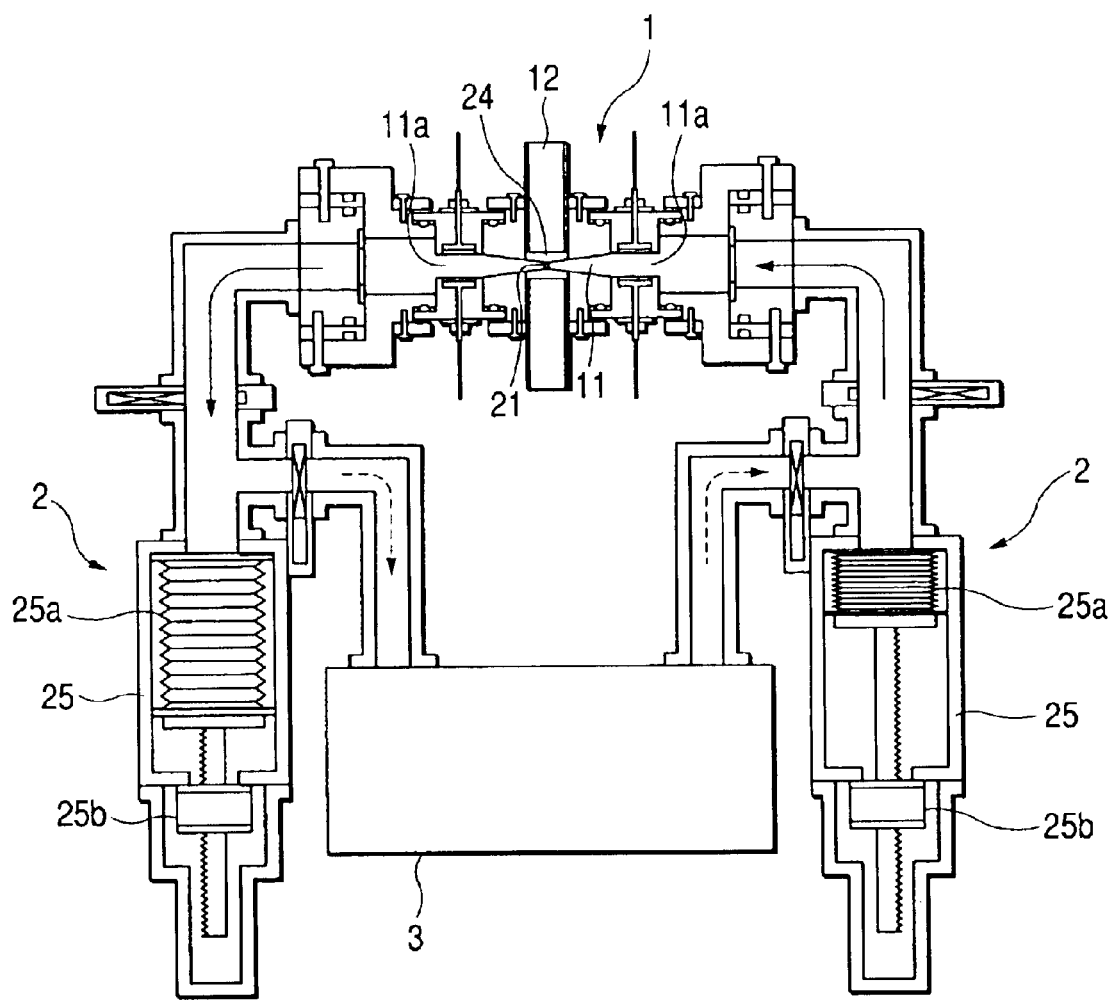
FIGS. 2A and 2B are drawings to show a different form from FIG. 1 in the first embodiment.
Figure 2B:
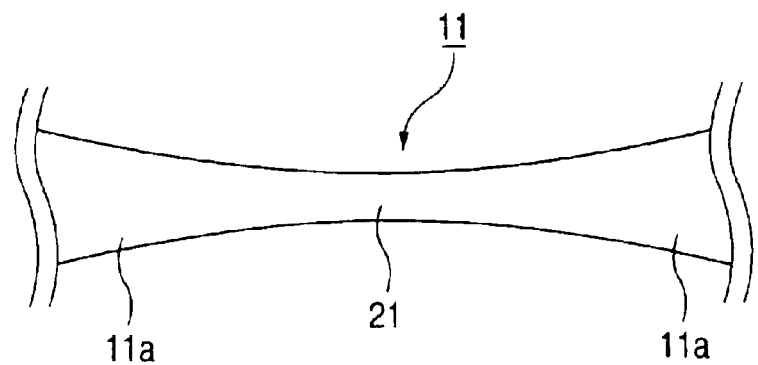

The laser chamber 1 is provided with a gas supply path structure 11 functioning as a laser tube, which is of a so-called convergent-divergent nozzle (also called a laval nozzle) type as a combination of a convergent shape for accelerating the flow of the laser gas with a divergent shape for decelerating the flow of the laser gas, as illustrated in FIG. 2B, and a waveguide tube 12 for exciting the laser gas in this gas supply path structure 11 into a plasma state.

Figure 3:
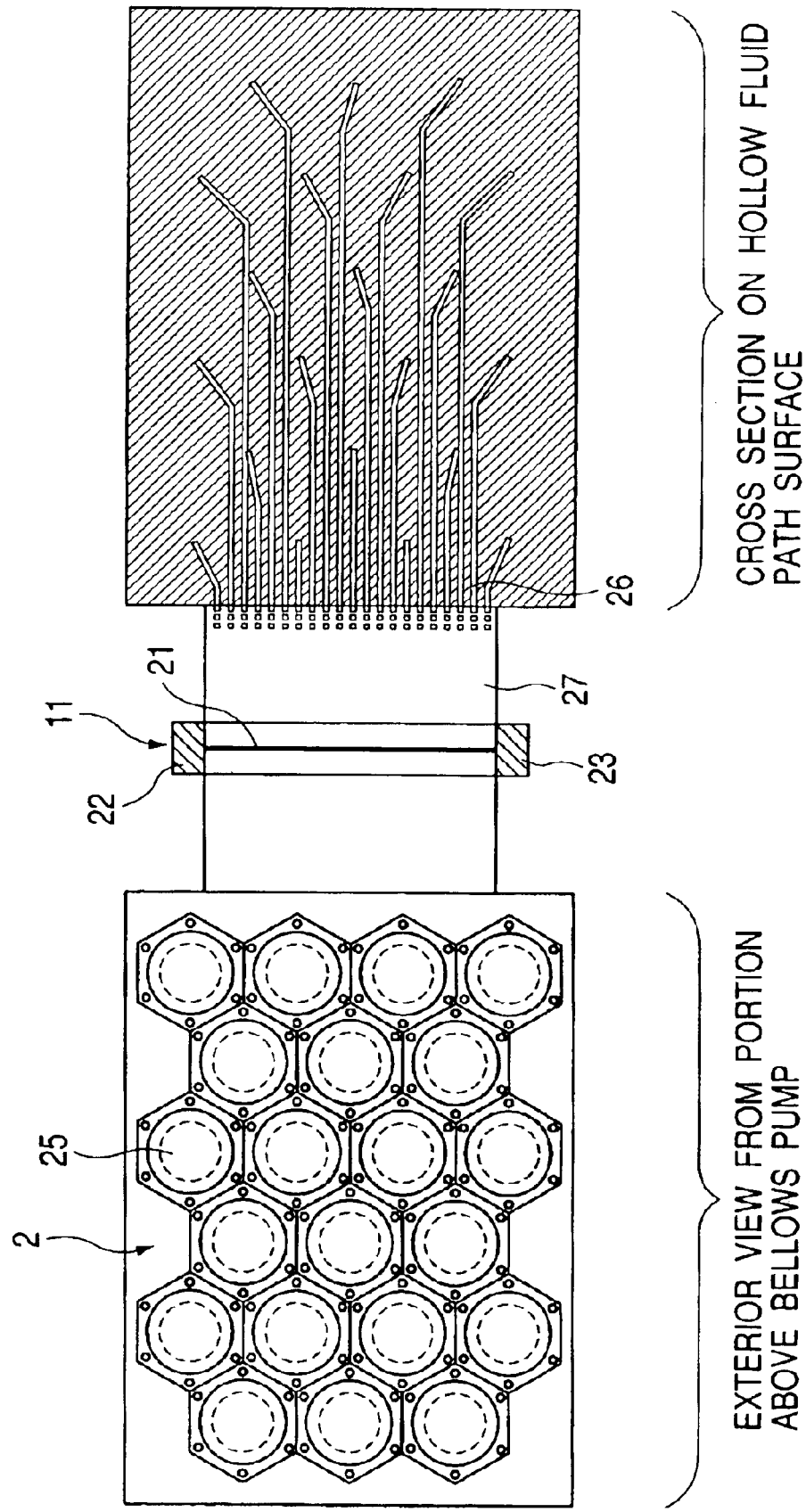
FIG. 3 is a schematic diagram to show the principal structure of the excimer laser oscillating apparatus according to the first embodiment.

The gas supply path structure 11 is a nozzle which forms a flow path for allowing the laser gas to flow thereinto or out thereof through a pair of inlet/outlet ports 11a, which is shaped so as to be narrowest at the central part, and which controls the laser gas to a predetermined speed less than the speed of sound (the predetermined speed will be referred to as subsonic speed) at the central part as described hereinafter. Note that a speed greater than the speed of sound will be referred to as supersonic speed. Here the central part, where the flow velocity of the laser gas reaches the subsonic speed, serves as a light emitting portion 21 for emitting the laser light. As illustrated in FIG. 3, a pair of reflecting structures 22,23, which are mirrors, prisms, or the like, are provided above and below this light emitting portion 21 in the figure and these reflecting structures 22,23 function to align the phase of the light emitted from the light emitting portion 21 to generate the laser light. In the present embodiment the laser gas flows in two directions, i.e., to the left and to the right, in the gas supply path structure 11 and, therefore, the gas supply path structure 11 is symmetric with respect to the center. One of the inlet/outlet ports 11a serves as a fluid inlet and the other as a fluid outlet, depending upon the direction of the gas flow.

Figure 4:
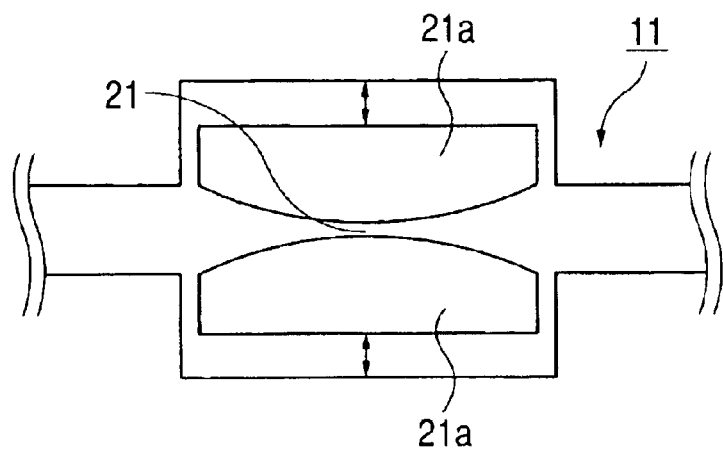
FIG. 4 is a schematic diagram to show a vertical width adjusting mechanism provided in a throat portion of the gas supply path structure.

The height (vertical width) of the passage of the laser gas at the light emitting portion 21 of this gas supply path structure 11 is fixed at a predetermined value in the example of FIG. 1 to FIG. 3, but the apparatus may be provided with a vertical width adjuster 21a for making the height of the light emitting portion 21 variable, for example, as illustrated in FIG. 4. This vertical width adjuster 21a is a pair of members arranged so as to be variable in vertical directions, which are opposed to each other so as to define the height of the light emitting portion 21 at a predetermined value. The height may also be regulated by placing a detachable spacer at the light emitting portion 21, instead of this vertical width adjuster 21a. A different gas supply path structure may also be realized by replacing the nozzle part with another.

The waveguide tube 12 is a means for supplying a microwave to the laser gas in the gas supply path structure 11 and a plurality of elongated slots are formed in the bottom portion. When the microwave is guided from the upper part of the waveguide tube 12, the microwave propagates in the waveguide tube 12 to be radiated through the slots 24 to the outside of the waveguide tube 12. The microwave thus radiated is guided through the slots 24 provided in the gas supply path structure 11 into the gas supply path structure 11. The microwave thus guided into the gas supply path structure excites the laser gas in the supply path structure 11 to generate the excimer laser light. A RF (radio-frequency) preionization discharge electrode 30 is provided in each of low-conductance portions 27 described hereinafter.

The specific function of the gas supply path structure 11 will be described herein. For convenience' sake of explanation, analysis is made on the basis of the presumption that the laser gas is a compressible gas and a perfect, ideal gas and that the flow is steady, one-dimensional, isentropic flow.

The following is the basic equations for the perfect, ideal gas and the isentropic, one-dimensional, steady flow thereof.

$$A\gamma v = A^* (\gamma P^*/\rho^*)^{1/2} \quad (1)$$

$$\{\gamma/(\gamma-1)\} \cdot (P/\rho) + (1/2)v^2 = [\gamma(\gamma+1)/\{2(\gamma-1)\}] \cdot (P^*/\rho^*) = \{\gamma/(\gamma-1)\} \cdot (P_{in}/\rho_{in}) \quad (2)$$

$$P\rho^{-\gamma} = const \quad (3)$$

$$PV = nRT \quad (4)$$

Eq. (1) is the equation of continuity, Eq. (2) the Bernoulli equation of the isentropic flow, Eq. (3) the adiabatic law of perfect, ideal gas, and Eq. (4) the equation of state of perfect, ideal gas. In these equations ρ represents the density, P the pressure, v the velocity, T the temperature, and A the cross-sectional area. The meanings of subscripts are defined as follows; a character without any subscript represents a value at an arbitrary point in the gas supply path structure 11, a character with subscript "in" a value at the fluid inlet, a character with subscript "out" a value at the fluid outlet, a character with subscript "throut" a value at the throat portion, and a character with subscript "*" a value at a virtual critical point at which the velocity of the gas flow becomes equal to a local speed of sound. Further, γ represents a ratio of specific heats, V the volume, n the number of moles, and R the gas constant.

At this time the structure of the gas supply path structure 11 is of the convergent-divergent nozzle type and the following equation is derived from the above four equations.

$$A_{out} / A_{throut} = \quad (5)$$
$$[\{(\gamma-1)/2\} \cdot \{2/(\gamma+1)\}^{(\gamma+1)/(\gamma-1)} / \{(P_{out}/P_{in})^{2/\gamma} - (P_{out}/P_{in})^{(\gamma+1)/\gamma}\}]^{1/2}$$

In this structure, when the speed of the gas flow at the throat portion 21 reaches a speed greater than the speed of sound, there almost always occurs the shock wave at the fluid outlet. In the present embodiment a ratio of pressures at the fluid inlet and at the fluid outlet of the gas in the gas supply path structure 11 is kept not less than a ratio of critical pressures determined by $P_{out}/P_{in}$ satisfying Eq. (5) so that the velocity of the gas at the throat portion 21 becomes the subsonic speed. Namely, the following relation holds where $P'_{out}$ indicates an actually set pressure at the fluid outlet.

$$P_{out}/P_{in} \leq P'_{out}/P_{in} \quad (6)$$

Further, the following relation holds when it is assumed herein that the gas flows in one direction.

$$P_{out}/P_{in} \leq P'_{out}/P_{in} < 1 \quad (7)$$

When the gas supply path structure 11 is used as a laser tube where the velocity of the gas is the subsonic speed everywhere, it is preferable to use the throat portion as a laser emitting portion.

Figure 5:
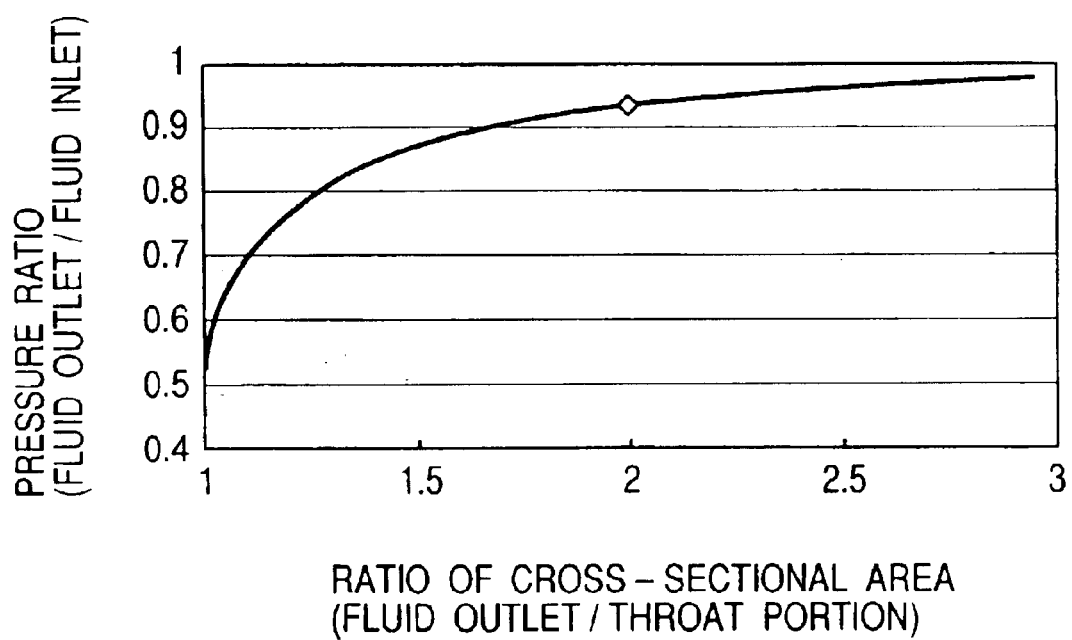
FIG. 5 is a characteristic diagram to show the relation between (cross-sectional area of fluid outlet/cross-sectional area of throat portion) and (pressure at fluid outlet/pressure at fluid inlet) in the gas supply path structure.

FIG. 5 is a characteristic diagram to show the relation between (cross-sectional area of the fluid outlet/cross-sectional area of the throat portion) and (pressure at the fluid outlet/pressure at the fluid inlet). Since the excimer laser gas is composed mostly of monoatomic gas, the ratio of specific heats γ is assumed to be 5/3. It is a matter of course that an average ratio of specific heats may also be used. Referring to FIG. 5, for example, supposing that the height at the fluid outlet (the vertical width of the fluid outlet) is double the height of the throat portion 21 (the vertical width of the narrowest part) (i.e., supposing a ratio of spatial cross-sectional areas of them is 2), the speed of the gas flow will not exceed the speed of sound, so as not to cause the shock wave, when the pressure at the fluid outlet is not less than about 0.93 times the pressure at the fluid inlet. For reference the gas speed at the throat portion 21 in the critical state is the speed of sound.

The speed of sound of the gas is a function of gas temperature. In the case of the KrF excimer laser gas, for example, supposing that a mixture ratio of gases is Ne:Kr:F$_2$=94.9:5:0.1 and assuming that the mixed gas is an ideal gas having the mean molecular weight M (Ne:20.18/Kr:83.8/F$_2$:38) of 23.4, the speed of sound a is expressed by the following equation.

$$a=(\gamma RT/M)^{1/2} \quad (8)$$

Therefore, the speed of sound at each temperature is given by Table 1 below.

TABLE 1

| Gas temperature | | speed of sound |
|---|---|---|
| ° C. | K | m/sec |
| −100 | 173.15 | 320.4 |
| 0 | 273.15 | 402.4 |
| 25 | 298.15 | 420.4 |
| 100 | 373.15 | 470.3 |
| 200 | 473.15 | 529.6 |
| 300 | 573.15 | 582.9 |

It is assumed herein that R is the gas constant, T absolute temperatures (K), and the ratio of specific heats γ the same as that of monoatomic molecules. It from this relation that it is not desirable to actively decrease the temperature of the inflow gas in the case of gas replacement at higher speeds. Conversely speaking, there are also cases wherein it is rather desirable to heat the laser gas for high-speed replacement at or below the subsonic speed. For the same reason, it is suggested that cooling the laser gas, if conducted, should be effected of the outlet side of the gas.

FIG. 6 shows the relation of the conditions to the velocity, Mach number, gas pressure, gas density, gas temperature, and speed of sound at each of the portions (fluid inlet, throat portion, fluid outlet) of the gas supply path structure 11.

In this FIG. 6, block A indicates variations of the aforementioned conditions from the fluid inlet to the throat portion 21 against the velocity (subsonic speed or supersonic speed) on side of the fluid inlet, while block B indicates variations of the aforementioned conditions from the throat portion 21 to the fluid outlet against the velocity (subsonic speed or supersonic speed) on side of the fluid outlet. When the velocity at the fluid inlet is the subsonic speed, the gas velocity thus increases with decrease in the distance to the throat portion 21 and reaches the maximum velocity at the throat portion 21. If this maximum velocity is the subsonic speed, the gas velocity will decrease with decrease in the distance to the fluid outlet. By using the gas supply path structure 11 of the convergent-divergent nozzle type as a laser chamber and adjusting the temperature and pressure at each portion in this way, it becomes possible to control the gas velocity at the throat portion 21 to the subsonic speed greater than those at the fluid inlet and at the fluid outlet.

If in the shape of the gas supply path structure 11 there exists an inflection point such as sudden expansion or sudden contraction or the like, there is a possibility that a region at or over the speed of sound is formed in a portion except for the throat portion 21. Therefore, the gas supply path structure 11 is desirably shaped so as to expand (or contract) relatively gently without a suddenly expanding portion.

Figure 9:
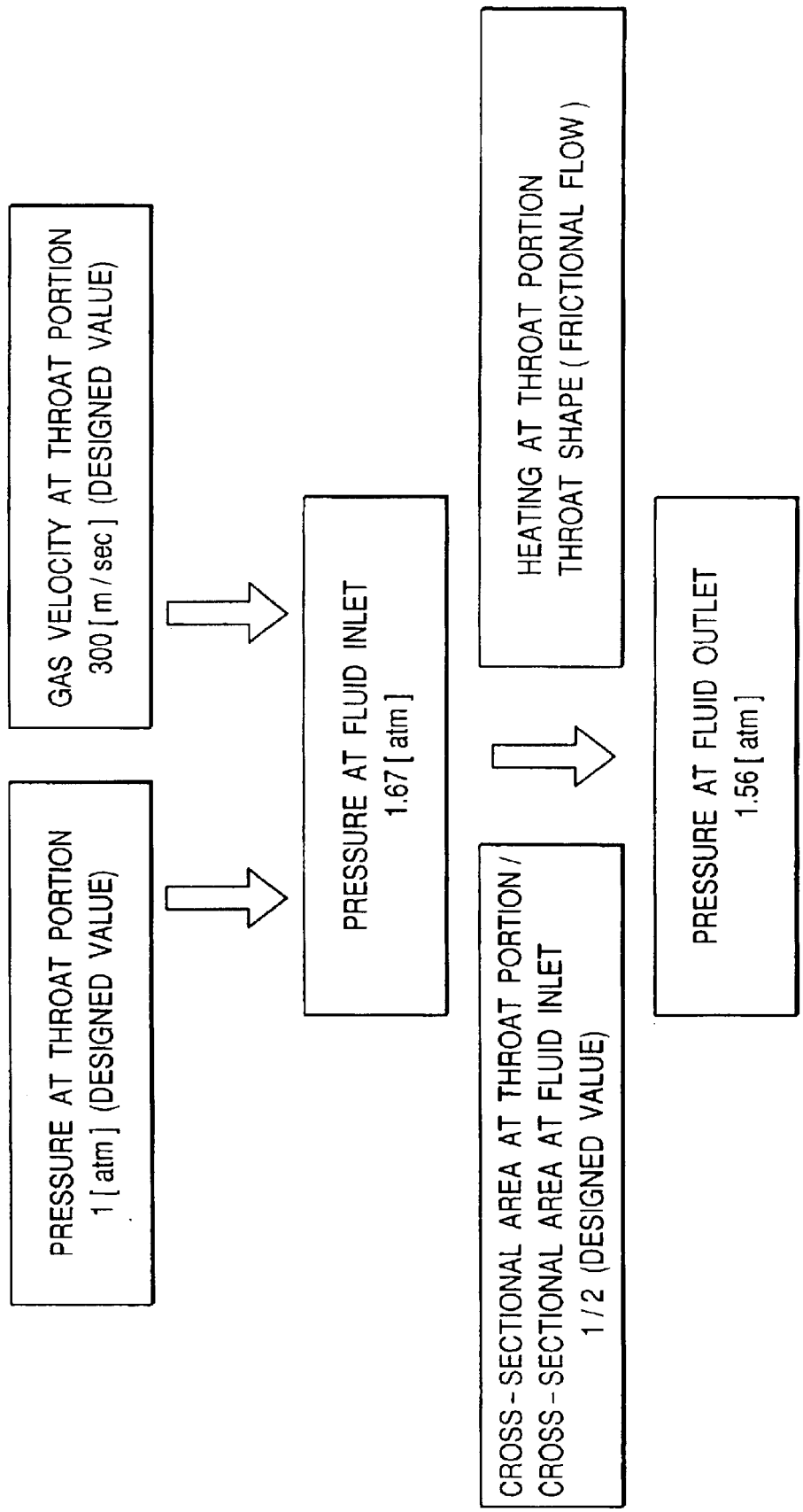
FIG. 9 is a block diagram to totally show the relation of conditions in control of the gas supply path structure.

The following will describe specific condition setting or the like for controlling the velocity at the throat portion 21 at the subsonic speed as described above, referring to FIG. 9.

The flow rate of the gas at the throat portion 21 depends upon the pressure at the inlet, as indicated by Eq. (9) below. In the equation f represents the flow rate of the gas at the throat portion 21 and P$_{throut}$ the pressure thereof. In this case, the relation between (pressure at the inlet/pressure at the throat portion) and (velocity at the throat portion) is as illustrated in FIG. 7.

$$f=P_{in}/(RT_{in})^{1/2} \cdot *[\{2\gamma/(\gamma-1)\} \cdot \{(P_{throut}/P_{in})^{2/\gamma}-(P_{throut}/P_{in})^{(\gamma+1)/\gamma}\}]^{1/2}/P_{throut}/P_{in})^{1/\gamma} \quad (9)$$

Figure 7:
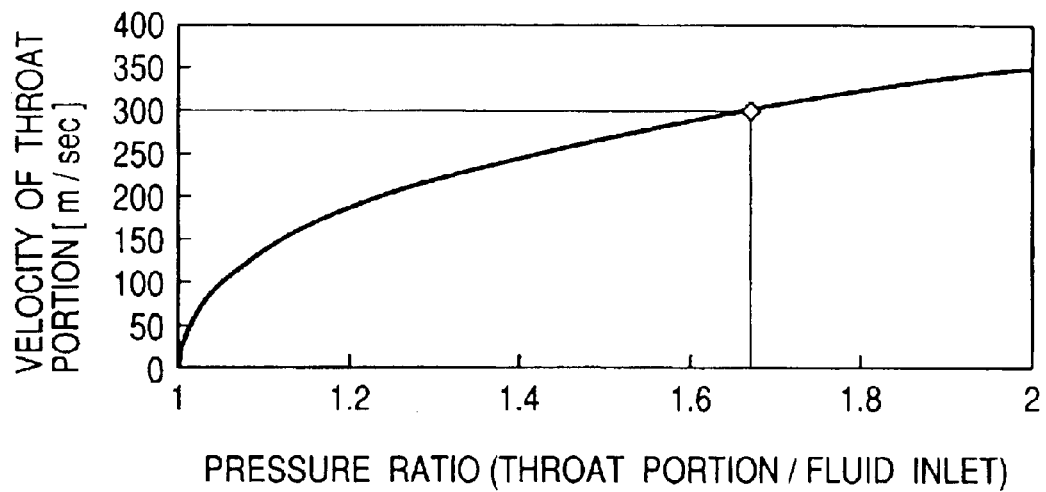
FIG. 7 is a characteristic diagram to show the relation between (pressure at throat portion/pressure at fluid inlet) and (velocity at throat portion) in the gas supply path structure.

It is seen from FIG. 7 that the velocity at the throat portion 21 can be controlled to 300 (m/s) by setting the pressure at the inlet to 1.67 (atm) and the pressure at the throat portion to 1 (atm). From the aforementioned consideration with FIG. 5, where the ratio of cross-sectional areas of the fluid inlet and the throat portion 21 is 2, the pressure at the outlet needs to be 1.56 (atm).

Since the pressure is relatively low at the outlet, it is expected that variation amounts at the outlet are greater than those in adjustment of the pressure at the inlet. It is thus preferable that the charging pressure of the laser gas be set to the pressure at the fluid outlet, the pressure at the inlet be kept up, and then the pressure at the outlet be kept constant.

Since the critical condition is not employed in practical systems, the calculation according to Eq. (5) may also be carried out with the following substitution; A$_{throut}$→A*, P$_{out}$→P, A$_{out}$→A (where A* is the cross-sectional area at the virtual critical point and P and A are the pressure and cross-sectional area at an arbitrary point).

Figure 8:
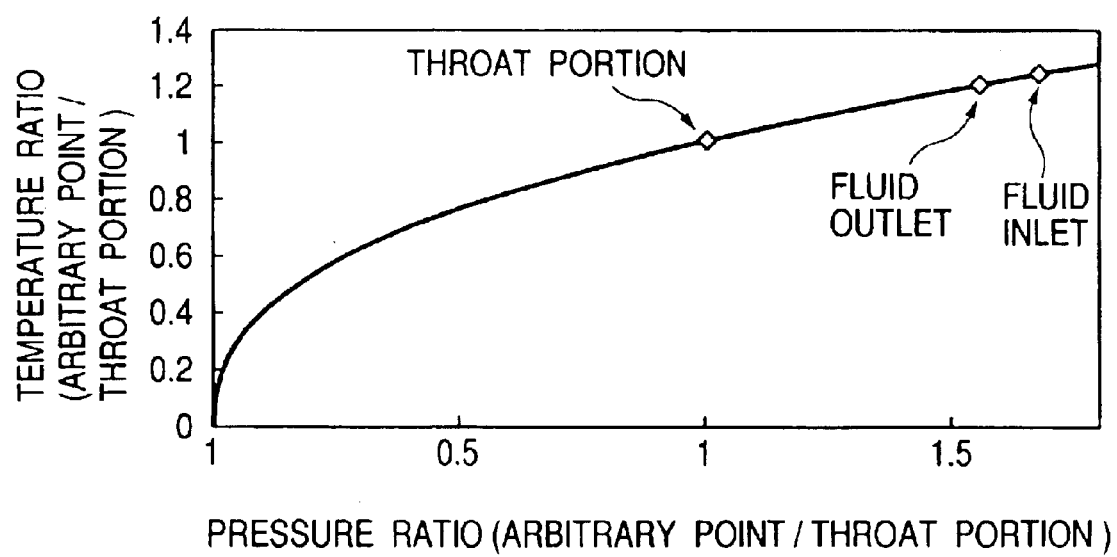
FIG. 8 is a characteristic diagram to show the relation between (pressure at an arbitrary point)/(pressure at the throat portion) and (temperature at an arbitrary point)/(temperature at the throat portion) in the gas supply path structure.

Further, the following equation holds where T$_{in}$ is the gas temperature at the fluid inlet, T the gas temperature at the arbitrary point, and P the gas pressure at the arbitrary point. In this case, the relation between (pressure at the arbitrary point/pressure at the throat portion) and (temperature at the arbitrary point/temperature at the throat portion) is as illustrated in FIG. 8.

$$T=T_{in}(P/P_{in})^{(\gamma+1)1/\gamma} \quad (10)$$

At this time, for example, supposing that the gas temperature at the inlet is 25° C. and that the state is adiabatic, the temperature at the light emitting portion is −30.3° C. and the gas temperature at the outlet is 16.9° C.

There are cases wherein unexpected variation occurs in the aforementioned conditions because of friction caused by the flow of the laser gas or heatup at the throat portion 21.

It is thus desirable to realize the shape that can lessen the friction; specifically, the surface of the gas supply path structure 11 is formed, for example, as a surface with high flatness or the surface is formed in structure without an inflection point (in smooth surface structure) by decreasing physical surface roughness by mechanical polishing, electrochemical buffing, or the like. At this time, in order to correct the ratio of critical pressures or the pressure at the fluid inlet in response to a rise of temperature occurring in the flow path (mainly, in the throat portion 21) of the gas supply path structure 11, it is preferable to monitor, for example, the temperature at the throat portion 21 (or monitor the velocity of gas at the throat portion 21 indirectly) and provide the system with a correcting means for finely adjusting the pressure at the inlet and/or the pressure at the outlet. It can be contemplated that the specific function of the correcting means is to increase the pressure at the outlet when the velocity of gas is low at the throat portion 21, for example.

The relation of the conditions as described above is totally illustrated in FIG. 9. As illustrated, for example, where the pressure at the throat portion is desired to be set to 1 (atm) and the velocity of the gas at the throat portion to 300 (m/s), the pressure at the inlet is set to 1.67 (atm). In addition, where (the cross-sectional area of the throat portion/the cross-sectional area of the fluid inlet) is designed to be ½ and if the aforementioned friction is decreased to a negligible level, the pressure at the outlet is set to 1.56 (atm). When these specific conditions are adopted, the velocity at the throat portion 21 can be controlled to a subsonic speed greater than the gas velocities at the inlet and at the outlet, specifically to 300 (m/s) herein as described above, while suppressing occurrence of the shock wave.

Each gas supply 2 is connected to either of the fluid inlet and the fluid outlet of the gas supply path structure 11 and they, together with the cooling device 3, compose a circulation system, which controls each of the velocity and pressure of the excimer laser gas at the inlet and/or at the outlet as described above. In this example each gas supply 2 is composed of a plurality of bellows pumps 25 coupled in a matrix.

Each bellows pump 25, as illustrated in FIG. 2A, is composed of a long-life bellows portion 25a which can expand and contract, and a servomotor 25b which carries out a quick and precise operation for adjusting expansion/contraction of this bellows portion 25a. Supposing here that the cross-sectional area of the throat portion 21 is, for example, 250 mm×2 mm (=5×10$^{-4}$ m$^2$), the necessary gas flow rate at the throat portion 21 is 0.11 m$^3$/s (=6.61 m$^3$/min). Assuming that the operating time of the bellows pump 25 is 0.2 s (or that the exposure time is 0.1 s), a volume of the gas pushed out every time by the bellows pump 25 is 2.21×10$^{-2}$ m$^3$ or 2.30×10$^{-2}$ m$^3$ at the inlet or at the outlet, respectively. Since a standard block telescopic volume (a volume resulting from subtraction of a volume at the shortest stroke from a volume at a longest stroke) of the long-life bellows pump 25 having the inside diameter of 50 mm is 0.115×10$^{-3}$ m$^3$, the bellows pumps 25 necessitated are 200 blocks or so. In this example, taking the volume for the initial operation, a guide path, etc. into consideration, the bellows pumps 25 of 210 blocks are prepared on each side. Since at most five blocks of bellows pumps 25 can be connected in series vertically, there are upper and lower arrays in a matrix composed of twenty one cells of bellows pumps 25 each cell comprising five blocks, operating in symmetry, as illustrated in FIG. 1 and FIG. 3, thus composing each gas supply 2.

The bellows portion 25a is formed in such heat-radiating structure as to match with the shape at the shortest stroke. This structure is desirably cylindrical in a sense of decreasing the gas contact area and the outer surface of the bellows portion 25a is desirably provided with fin structure 29 for increasing the heat radiation area. If the rise of the temperature of the laser gas is not negligible, it can be handled by also providing the inner surface of the bellows portion 25a with the fin structure.

Since the bellows pumps 25 are arranged in series as described above, the atmospheric pressure outside the bellows pumps 25 is preferably set to a pressure higher than the pressure inside the bellows pumps 25 in consideration of prevention of buckling.

In order to increase work efficiency of the bellows pumps 25, it is necessary to control the volume of the supply system from the bellows pumps 25 to the throat portion 21 to the minimum. Thus, as illustrated in FIG. 3, hollow fluid paths 26 having the diameter φ of about 4 mm, for example, are provided so as to couple each bellows pump 25 to the throat portion 21. Further, the system is provided with the low-conductance portion and the RF preionization discharge electrode for forming the uniform gas flow in the vicinity of the throat portion 21. These low-conductance portion and RF preionization discharge electrode can be constructed as a spatially common member and they are represented as an integral member of the low-conductance part 27 in the illustrated example. In this example the low-conductance part 27 is, for example, 50 mm to 100 mm long and 4 mm high and the throat portion 21 is about 4 mm long and 2 mm high.

The cooling device 3 is connected to each gas supply 2 and has the function of cooling the laser gas. This cooling device 3, the gas supplies 2, and the gas supply path structure 11 compose a gas circulation system and the flowing directions of the laser gas are alternated by actuation of the bellows pumps 25 of the gas supplies 2. A preferred cooling method of the laser gas by the cooling device 3 is a way of cooling the heated laser gas after passage through the gas supply path structure 11. This is for the following reasons. If the laser gas is preliminarily cooled before supply to the gas supply path structure 11 the sound speed of the gas will be lowered so as to lower the upper limit of the initial subsonic speed. If the laser gas is cooled during acceleration thereof the velocity of the gas will be lowered.

In FIG. 2A the cooling device 3 is placed separately from the gas supply path structure 11 and the gas supplies 2, but it is also possible to cool the laser gas in the hollow fluid paths 26 in the feed passage 28 of FIG. 1, depending upon circumstances, as described previously. Further, it is needless to mention that the heat radiation fins 29 of the bellows portions 25a and the bellows portions 25a themselves have the function as a cooler.

Conversely, the preliminary heating of the laser gas is effective to increase of speed of sound. However, heating, particularly, of the throat portion 21 (also including heating due to the microwave) should better be avoided, because a choke phenomenon (an apparent decrease of cross-sectional area due to heating) occurs so as to make it difficult to satisfy the designed gas flow rate, though it contributes to the increase of the gas velocity. When this problem due to the heating is pronounced, the operating pressure of the bellows pumps 25 should be changed, because it changes the substantial ratio of cross-sectional areas.

As described above, the excimer laser oscillating apparatus of the first embodiment is arranged to set the pressure and velocity of the gas at the outlet and/or at the inlet and employs the gas supply path structure 11 of the convergent-divergent nozzle type in the laser chamber 1. This makes it possible to control the velocity of the excimer laser gas in the light emitting portion 21 to the predetermined subsonic speed while suppressing the occurrence of the shock wave, about which concern grows with proximity to the sound speed. The gas supply path structure can thus be replenished quickly with the excimer laser gas, which is apt to be exhausted, without concern about the occurrence of the shock wave. Therefore, the present embodiment realizes the excimer laser oscillating apparatus that can maintain the stable light emission over a long time.

Thanks to this totally simple structure, all the surfaces can be subjected to a surface treatment for suppressing degassing as impurities to the laser gas or a fluorine passivation treatment under a perfect control of consumption of $F_2$ gas, which is also extremely effective to extension of the life of the laser gas.

Some modifications of the excimer laser oscillating apparatus according to the first embodiment will be described below. Each of the members etc. described in the first embodiment will be denoted by the same symbol and the description thereof will be omitted.

Modification 1

Figure 10A:
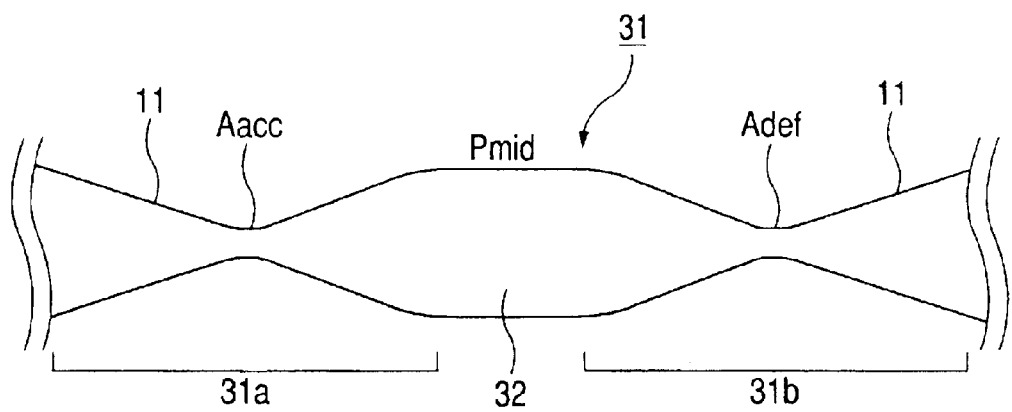
FIGS. 10A and 10B are cross-sectional views to show only the gas supply path structure of the excimer laser oscillating apparatus in Modification 1 of the first embodiment.
Figure 10B:
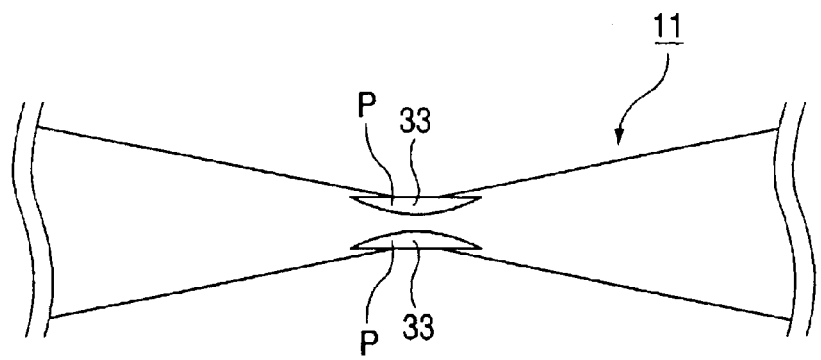

This excimer laser oscillating apparatus of Modification 1 has the structure approximately similar to that of the first embodiment, but is different in the shape of the portion corresponding to the gas supply path structure. FIGS. 10A and 10B are cross-sectional side views to show only the gas supply path structure of the excimer laser oscillating apparatus of Modification 1.

A gas supply path structure group 31 is composed of a pair of gas supply path structures 11 connected in series (the size of the individual gas supply path structures 11 can be different from the gas supply path structure 11 of the first embodiment), in which the front-end gas supply path structure 11 serves as a supersonic acceleration portion 31a, the post-end gas supply path structure 11 as a supersonic deceleration portion 31b, and the central part as a light emitting portion 32. In this gas supply path structure group 31 the velocity of the gas at the light emitting portion 32 can be controlled to the supersonic speed by adjusting the gas velocity, the gas pressure, or the like at the inlet and/or at the outlet of the excimer laser gas, for example, by replacing $P_{out}$ in Eq. (5) with a pressure $P_{mid}$ at the light emitting portion 32 of FIG. 10A and making a pressure difference not less than the determined ratio of critical pressures.

With a pair of the aforementioned, predetermined portions having the narrowest width (the cross-sectional area of which is represented by Aacc, Adef), the condition of Aacc<Adef needs to be satisfied at the start herein. Therefore, where the gas flowing directions in the gas supply path structure group 31 are the two ways, the cross-sectional areas Aacc, Adef have to be variable. In order to make variable the height (vertical width) of the passage of the laser gas in the pair of predetermined portions of gas supply path structures 11, each of the pair of predetermined portions is provided with a vertical width adjuster 33, for example, as illustrated in FIG. 10B. Each of these vertical width adjusters 33 is composed, for example, of a pair of members having a triangular sectional shape, whereby the vertical width can be changed by rocking the members on the fulcrum P.

As described above, the excimer laser oscillating apparatus of Modification 1 uses the paired gas supply path structure group 31 of the convergent-divergent nozzle type in the laser chamber 1 and is arranged to adjust the pressure and velocity of the gas at the inlet and/or at the outlet, so that it can control the velocity of the excimer laser gas in the light emitting portion 32 to the predetermined supersonic speed while suppressing the occurrence of the shock wave, which can occur under almost all the conditions over the speed of sound. Therefore, the gas supply path structure group can be replenished quickly with the excimer laser gas, which is apt to be exhausted, without concern about the occurrence of the shock wave. Modification 1 can also realize the excimer laser oscillating apparatus that can maintain the stable light emission over a long time.

Modification 2

Figure 11:
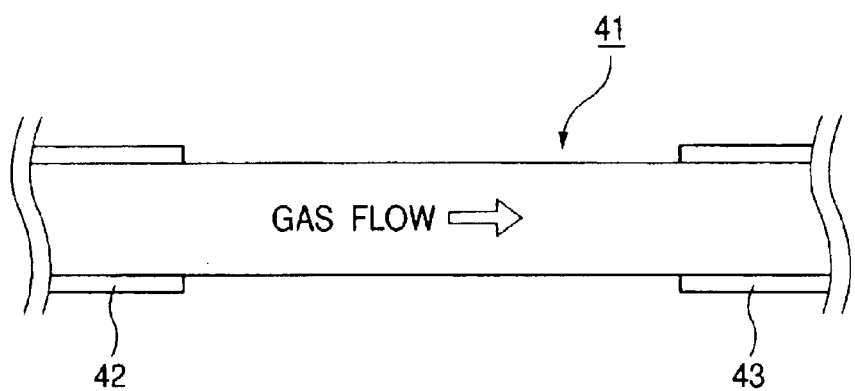
FIG. 11 is a cross-sectional view to show only the gas supply path structure of the excimer laser oscillating apparatus in Modification 2 of the first embodiment.

This excimer laser oscillating apparatus of Modification 2 has the structure approximately similar to that of the first embodiment but is different in the shape of the portion corresponding to the gas supply path structure. FIG. 11 is a cross-sectional view to show only the gas supply path structure of the excimer laser oscillating apparatus of Modification 2.

In Modification 2 the gas supply path structure is a gas supply path structure 41 having the constant height, which has been used heretofore. A heating/cooling device 42 is placed at the inlet of the gas of the gas supply path structure 41 and a heating/cooling device 43 at the outlet. FIG. 12 shows the relation of the conditions to the velocity, Mach number, gas pressure, gas density, gas temperature, and sound speed at each of the portions (the inlet, the light emitting portion, the outlet) of the gas supply path structure 41, where the inlet of gas is heated while the outlet is cooled, ignoring occurrence of friction due to the gas flow inside the gas supply path structure 41.

In this FIG. 12, similar to FIG. 6 described in the first embodiment, block A represents variations of the aforementioned conditions from the inlet to the light emitting portion (which is assumed to exist near the central part herein) against the velocity (subsonic speed or supersonic speed) on side of the inlet and block B represents variations of the aforementioned conditions from the light emitting portion to the outlet against the velocity (subsonic speed or supersonic speed) on side of the outlet. For example, supposing the velocity at the inlet is the subsonic speed and the inlet is heated by the heating/cooling device 42, the velocity of the gas increases to the maximum at the light emitting portion. Supposing this maximum speed is the subsonic speed and the outlet is cooled, the velocity of the gas decreases with decrease in the distance to the outlet. By employing this gas supply path structure 41 for the laser chamber 1 and adjusting the temperature and pressure at each of the portions, the velocity at the light emitting portion can be controlled to the subsonic speed greater than the speeds at the inlet and at the outlet, while suppressing the occurrence of the shock wave.

The excimer laser oscillating apparatus of Modification 2, however, needs high thermal energy for the control of the gas supply path structure 41, and it is thus more practical to use it, for example, in combination with the gas supply path structure 11 in FIG. 2B or with the gas supply path structure group 31 in FIG. 10A.

As described above, the excimer laser oscillating apparatus of Modification 2 employs the gas supply path structure 41 having the constant height in the laser chamber 1 and is arranged to adjust the pressure and velocity of the gas at the inlet and/or at the outlet, so that it can control the velocity of the excimer laser gas in the light emitting portion to the predetermined supersonic sp ed, while suppressing the occurrence of the shock wave, about which concern grows with proximity to the speed of sound. Therefore, the gas supply path structure group can be replenished quickly with the excimer laser gas, which is apt to be exhausted, without concern about the occurrence of the shock wave. The present modification can also realize the excimer laser oscillating apparatus that can maintain the stable light emission over a long time.

Modification 3

Figure 13:
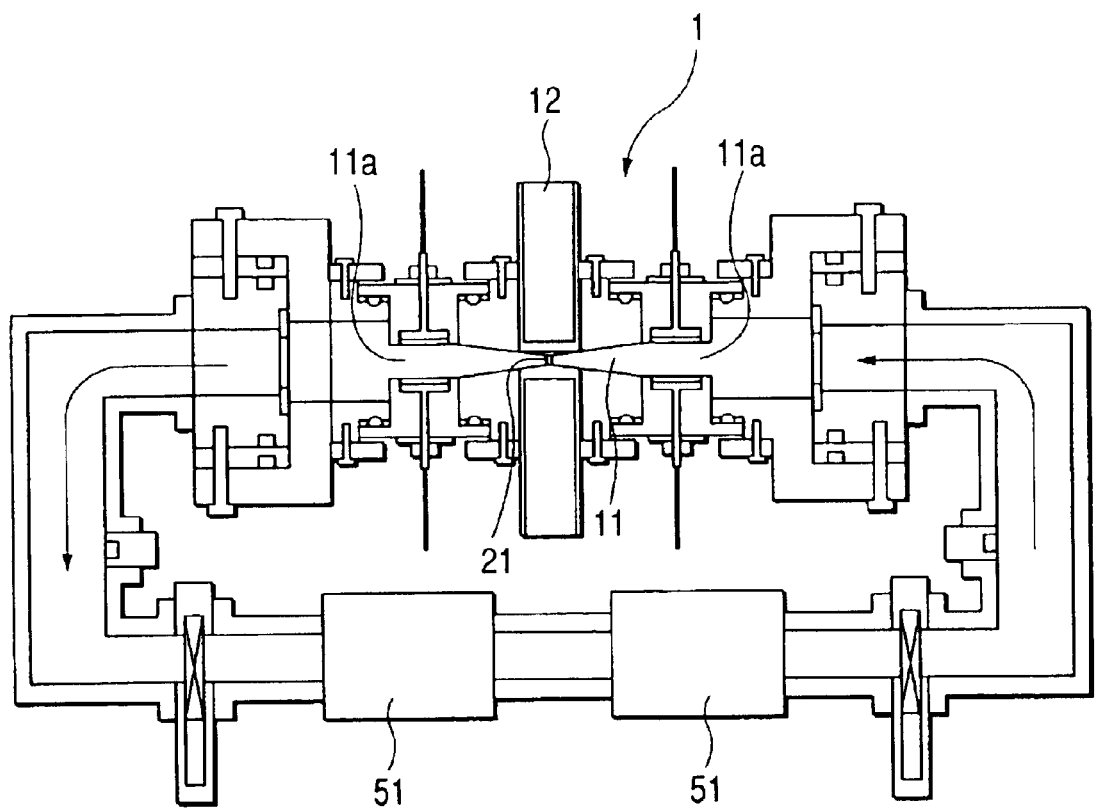
FIG. 13 is a cross-sectional side view to show the schematic structure of the excimer laser oscillating apparatus in Modification 3 of the first embodiment.

This excimer laser oscillating apparatus of Modification 3 has the structure approximately similar to that of the first embodiment and is different in the shape of the portion corresponding to the gas supply means 2. FIG. 13 is a cross-sectional side view to show the schematic structure of the excimer laser oscillating apparatus of Modification 3.

Figure 14:
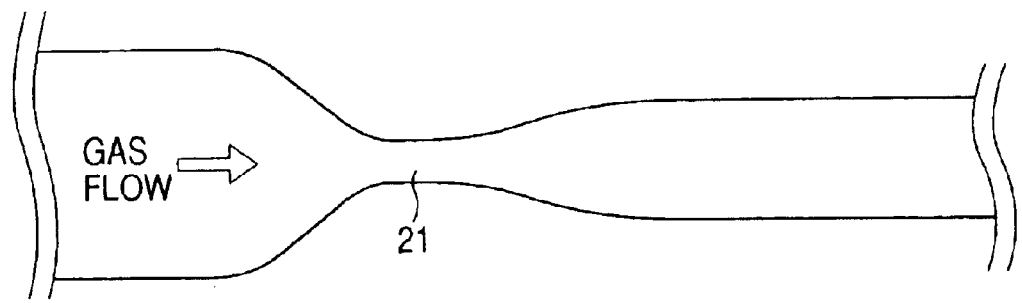
FIG. 14 is a cross-sectional side view to show another example of the gas supply path structure in Modification 3 of the first embodiment.

Modification 3 has the gas supply path structure 11 of the convergent-divergent nozzle type in the laser chamber 1, similar to the first embodiment, but each gas supply means 51 is comprised of a multiblade fan (Sirocco fan), a blower, a circulating pump, or the like. Since the flowing direction of the excimer laser gas is thus regulated to one direction, the gas supply path structure 11 does not always have to be symmetric with respect to the center. It is thus better to use the gas supply path structure of the shape optimized for the shape of the acceleration nozzle at the inlet and for the shape of the deceleration nozzle at the outlet, for example as illustrated in FIG. 14, taking the control of the gas velocity, the gas pressure, etc. at the inlet and at the outlet into consideration.

As described above, the excimer laser oscillating apparatus of Modification 3 employs the gas supply path structure 11 of the convergent-divergent nozzle type in the laser chamber 1 and is arranged to adjust the gas pressure and the gas velocity at the inlet and/or at the outlet, so that it can control the velocity of the excimer laser gas in the throat portion to the predetermined subsonic speed while suppressing the occurrence of the shock wave, about which concern grows with proximity to the speed of sound. Therefore, the gas supply path structure can be replenished quickly with the excimer laser gas, which is apt to be exhausted, without concern about the occurrence of the shock wave. The present modification can also realize the excimer laser oscillating apparatus that can maintain the stable light emission over a long time.

In addition, the gas supply path structure does not always have to be symmetric with respect to the center, and the restraint on the shape is thus relaxed, so as to permit use of gas supply path structures in shapes according to various conditions.

The present embodiment and the modifications thereof showed the examples of the excimer laser oscillating apparatus using the gas supply path structure under the predetermined conditions, but it should be noted that the present invention is not limited to these. The gas supply path structure has the excellent effect of capability of easily and safely forming the gas flow at the subsonic speed close to the sound speed without concern about the occurrence of the shock wave. The present embodiment showed the excimer laser oscillating apparatus as an example most requiring this effect, and it is needless to mention that it can also be applied to other various devices and systems. For example, as stated in the present embodiment, the gas supply path structure 11 can also be applied to a variety of cooling devices, by making use of the effect in which use of the gas supply path structure 11 permits the suddenly lowered temperature of gas at the light emitting portion to be realized under the conditions of the predetermined pressure etc. while keeping the gas temperature at the inlet and at the outlet, approximately at ordinary temperature.

The gas supply path structure is also suitably applicable to all devices for high-speed gas cooling or replacement used in facilities requiring low vibration, particularly, such as clean rooms, because the occurrence of the shock wave is suppressed.

(Second Embodiment)

Figure 15:
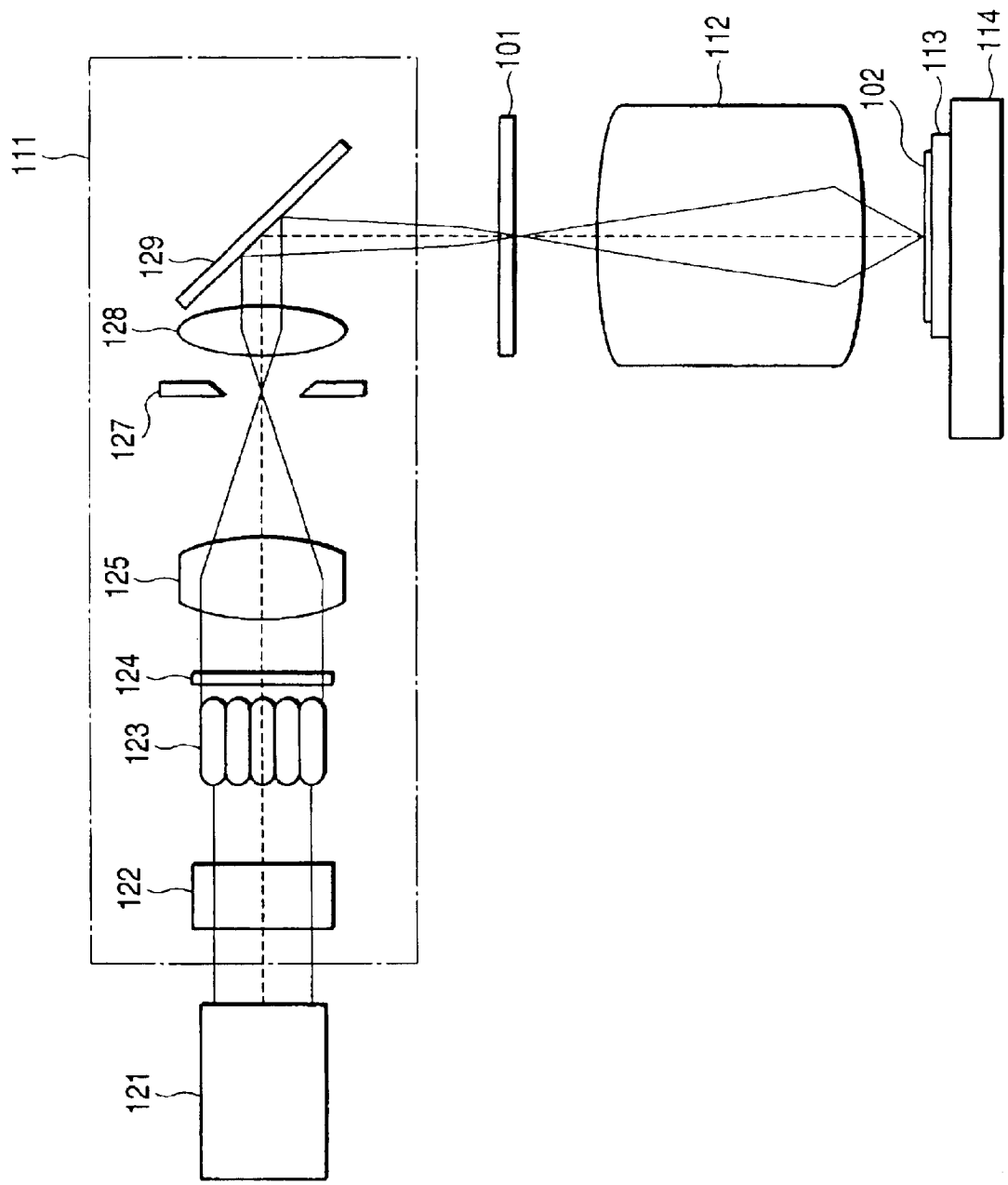
FIG. 15 is a schematic diagram to show a stepper of the second embodiment.

The second embodiment will be described below. The second embodiment shows an example of the exposure apparatus (stepper) having the excimer laser oscillating apparatus described in the first embodiment (and the modifications thereof) as a laser light source. FIG. 15 is a schematic diagram to show the principal structure of this stepper.

This stepper is comprised of an optical system 111 for radiating illumination light to a reticle 101 in which a desired pattern is drawn, a projection optical system 112 to which the illumination light having passed through the reticle 101 is incident and which is for projecting the pattern of the reticle 101 onto a surface of wafer 102 at a demagnification ratio, a wafer chuck 113 on which the wafer 102 is mounted and fixed, and a wafer stage 114 to which the wafer chuck 113 is fixed.

The optical system 111 is composed of the excimer laser oscillating apparatus 121 of the first embodiment as a light source for emitting the excimer laser light at high luminance as the illumination light, a beam shape converting device 122 for converting the illumination light from the light source 121 into a desired beam shape, an optical integrator 123 comprised of a plurality of cylindrical lenses or microlenses arranged two-dimensionally, a stop member 124 which can be replaced with an arbitrary stop by means of an unrepresented switch and which is placed near the position of secondary light sources formed by the optical integrator 123, a condenser lens 125 for condensing the illumination light having passed through the stop member 124, a blind 127 which is composed, for example, of four variable blades and which is placed on a conjugate plane with the reticle 101 to determine an arbitrary illumination range on the surface of the reticle 101, an imaging lens 128 for projecting the illumination light determined in the predetermined shape by the blind 127 onto the surface of the reticle 101, and a bending mirror 129 for reflecting the illumination light from the imaging lens 128 toward the reticle 101.

Now described is the operation for projecting the pattern of the reticle 101 onto the surface of the wafer 102 at the demagnification ratio, using the stepper constructed in the above structure.

First, the illumination light emitted from the light source 121 is converted into the predetermined shape by the beam shape converter 122 and thereafter is directed to the optical integrator 123. At this time a plurality of secondary light sources are formed near the exit surface of the optical integrator 123. The illumination light from these secondary light sources travels through the stop member 124 to be condensed by the condenser lens 125 and then the illumination light is defined in the predetermined shape by the blind 127. After that, the illumination light travels through the imaging lens 128 to be reflected by the bending mirror 129 toward the reticle 101. Subsequently, the illumination light passes through the pattern of the reticle 101 to be incident to the projection optical system 112. Then the illumination light passes through the projection optical system 112, so that the pattern is reduced into the predetermined size to be projected onto the surface of the wafer 102, thus effecting exposure.

With the stepper of the present embodiment, the use of the excimer laser oscillating apparatus of the first embodiment as a laser light source permits the light emission of high-power excimer laser light for a relatively long time, whereby the exposure can be carried out quickly and accurately on the wafer 102.

Next described is an example of a method for producing semiconductor apparatus (semiconductor devices) by use of the projection exposure apparatus described referring to FIG. 15.

Figure 16:
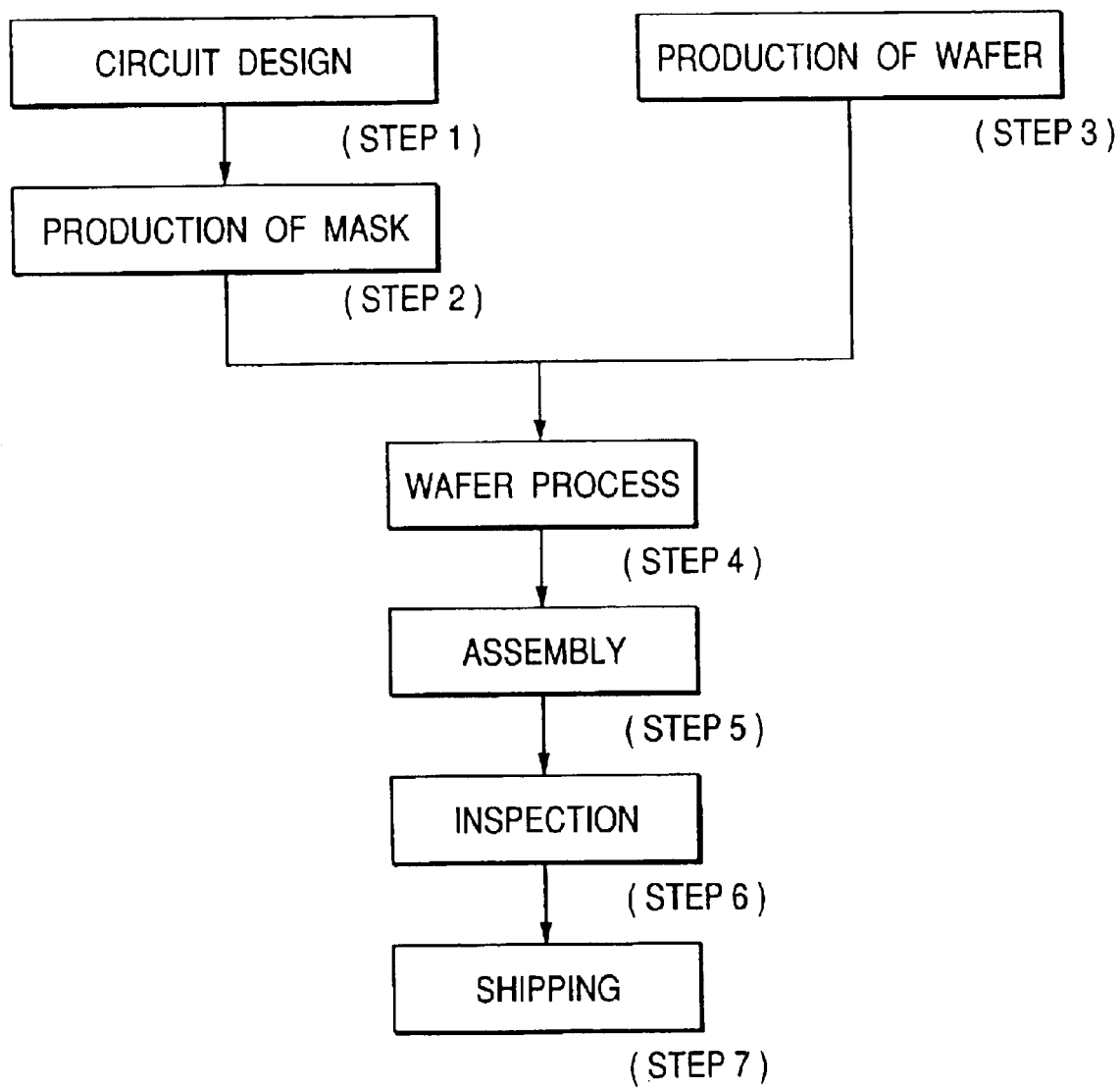
FIG. 16 is a flowchart to show production steps of semiconductor devices using the stepper of the second embodiment.

FIG. 16 shows a flow of production steps for producing the semiconductor devices (such as semiconductor chips of IC, LSI, etc., liquid-crystal panels, CCDs, or the like). First, step 1 (circuit design) is a step of designing circuits of the semiconductor devices. Step 2 (production of mask) is a step of producing a mask in which the circuit pattern designed is formed. On the other hand, step 3 (production of wafer) is a step of producing a wafer of a material such as silicon or the like. Step 4 (wafer process) is called a pre-step in which actual circuits are formed on the wafer by the photolithography technology, using the mask and wafer prepared as described above. Next step 5 (assembly) is called a post step which is a step of forming semiconductor chips from the wafer prepared in step 4 and which includes steps such as an assembly step (dicing, bonding), a packaging step (encapsulation of chip), and so on. Step 6 (inspection) is a step of carrying out inspection including an operation check test, a durability test, and so on for the semiconductor devices produced in step 5. The semiconductor devices are completed through such steps and they are shipped (step 7).

Figure 17:
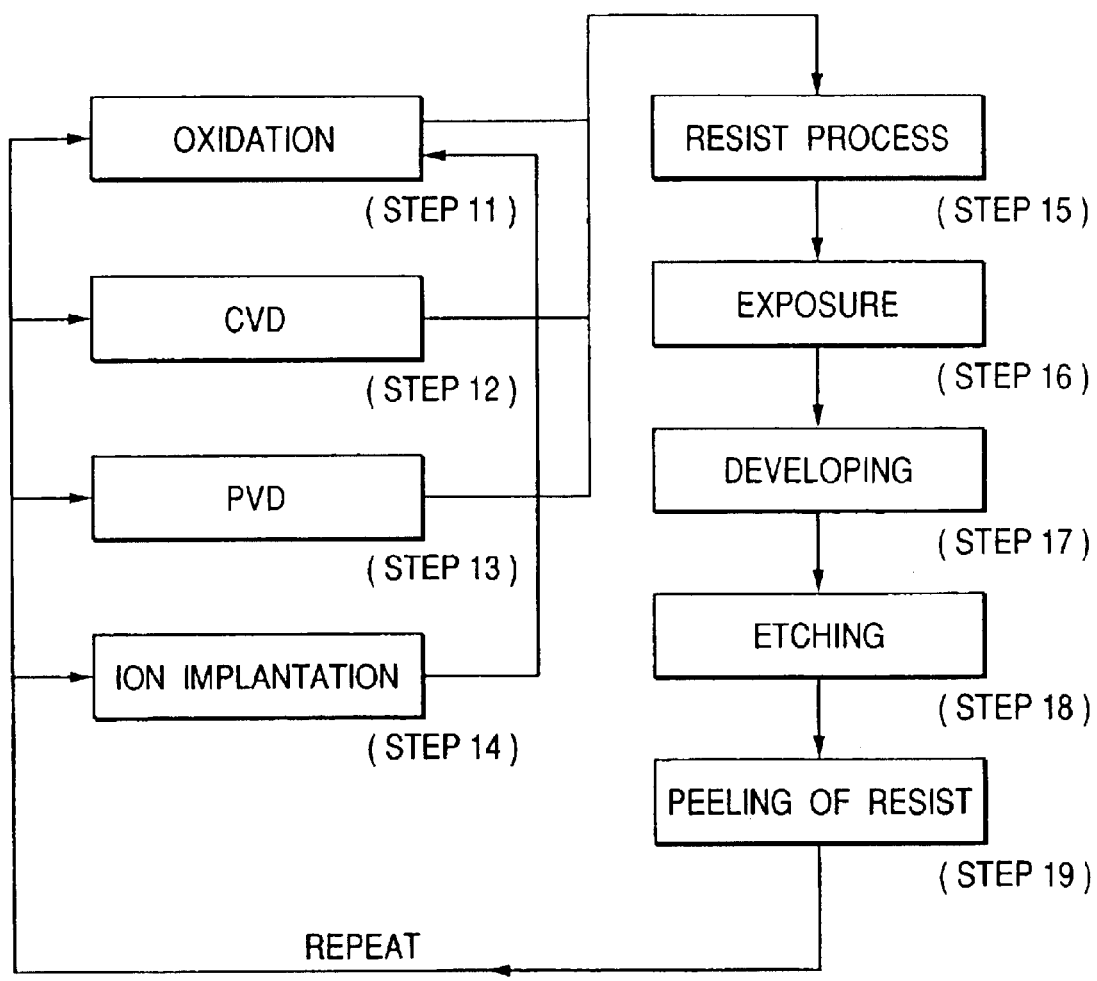
FIG. 17 is a flowchart to show the details of the wafer process in FIG. 16.

FIG. 17 shows a detailed flow of the above wafer process. Step 11 (oxidation) is a step of oxidizing the surface of the wafer. Step 12 (CVD) is a step of forming an electroconductive film or an electrically insulating film on the wafer surface by vapor phase reaction. Step 13 (PVD) is a step of forming an electroconductive film or an electrically insulating film on the wafer by sputtering or vapor deposition. Step 14 (ion implantation) is a step of implanting ions into the wafer. Step 15 (resist process) is a step of coating the wafer with a photosensitive agent. Step 16 (exposure) is a step of printing the circuit pattern of the mask onto the wafer by the projection exposure apparatus described above. Step 17 (development) is a step of developing the exposed wafer. Step 18 (etching) is a step of etching away portions other than the resist image developed. Step 19 (peeling of resist) is a step of removing the resist which is now unnecessary after completion of the etching. These steps are carried out repeatedly to form multilayer circuit patterns on the wafer.

Use of this production method permits the semiconductor devices of high integration, which were hard to produce heretofore, to be produced readily and accurately at a high yield.

The present invention makes it possible to provide the gas supply path structure (and the gas supply method) capable of suppressing the occurrence of the shock wave while forming the high-speed flow close to the speed of sound in the simple structure. Particularly, when this gas supply path structure is applied to the excimer laser oscillating apparatus, the apparatus can be replenished with the excimer laser gas, which is apt to be exhausted, without concern about the occurrence of the shock wave, and the apparatus can maintain the stable light emission over a long time.

What is claimed is:

1. An excimer laser comprising: a gas supply structure including a first port serving as a first fluid inlet and a second fluid outlet, not; a second port serving as a second fluid inlet and a first fluid outlet and a throat portion provided between the first and second ports, wherein the first and second ports are symmetric with respect to the throat portion as a center;

a gas supplier capable of supplying a laser gas into the gas supply structure in two directions such that a flow speed of the laser gas supplied in either of said two directions is less than a speed of sound at the throat portion; and a waveguide unit having a plurality of slots, for guiding microwaves into the gas supply structure through the plurality of slots, to excite the laser gas.

2. The excimer laser according to claim 1, further comprising a circulation system for circulating said laser gas flowing out of one of said fluid outlets, into the other of said fluid inlets.

3. The excimer laser according to claim 2, wherein said circulation system is comprised of at least one bellows pump.

4. The excimer laser according to claim 2, wherein said circulation system is comprised of at least one circulating pump.

5. The excimer laser according to claim 2, wherein said circulation system is comprised of at least one blower.

6. The excimer laser according to claim 2, wherein said circulation system is comprised of at least one fan.

7. The excimer laser according to claim 1, wherein said gas supply path structure being arranged so that a ratio of a pressure at one of said fluid inlets to a pressure at the other of said fluid outlets is not less than a ratio of critical pressures.

8. The excimer laser according to claim 1, wherein said laser gas is an excimer laser gas which is a mixture of $F_2$ gas with at least one inert gas selected from Kr, Ar, Ne, and He.

9. The excimer laser according to claim 1, wherein said gas supply path structure for supplying said laser gas, said gas supply path structure being a structure without an inflection point.

10. The excimer laser according to claim 1, wherein further comprising at least one pressure correcting means for correcting a pressure at said first port or at said second port.

11. The excimer laser according to claim 1, further comprising at least one temperature correcting means for correcting a temperature at said first port or at said second port.

12. The excimer laser according to claim 11, wherein said temperature correcting means has a cooling function and wherein said cooling is effected near said port acting as said fluid outlet.

13. The excimer laser according to claim 1, wherein said gas supply path structure further comprising vertical width adjusting means for adjusting a vertical width of said throat portion.

14. An excimer laser comprising: a gas supply path structure group including a first port serving as a first fluid inlet and a second fluid outlet, a second port serving as a second fluid inlet and a first fluid outlet and a throat portion provided between the first and second ports, wherein the first and second ports are symmetric with respect to the throat portion as a center;

a gas supplier capable of supplying a laser gas to the first or second fluid inlet; and a waveguide unit having a plurality of slots, for guiding microwaves into the gas supply path structure group through the plurality of slots, to excite the laser gas; and wherein said gas supply path structure group includes a light emitting portion for generating a laser beam, and the flow speed of said laser gas at said light emitting portion is higher than a speed of sound.

15. The excimer laser according to claim 14, further comprising a circulation system for circulating said laser gas flowing out of said port acting as a fluid outlet of said gas supply path structure group, into said port acting as a fluid inlet of said gas supply path structure group.

16. The excimer laser according to claim 15, wherein said circulation system is comprised of at least one bellows pump.

17. The excimer laser according to claim 15, wherein said circulation system is comprised of at least one circulating pump.

18. The excimer laser according to claim 15, wherein said circulation system is comprised of at least one blower.

19. The excimer laser according to claim 15, wherein said circulation system is comprised of at least one fan.

20. The excimer laser according to claim 14, wherein said laser gas is an excimer laser gas which is a mixture of $F_2$ gas with at least one inert gas selected from Kr, Ar, Ne, and He.

21. The excimer laser according to claim 14, wherein said gas supply path structure group being a structure without an inflection point.

22. The excimer laser according to claim 14, further comprising at least one pressure correcting means for correcting a pressure at said port acting as a fluid inlet of said gas supply path structure group or at said port acting as a fluid outlet of said gas supply path structure group.

23. The excimer laser according to claim 14, further comprising at least one temperature correcting means for correcting a temperature at said port acting as a fluid inlet of said gas supply path structure group or at said port acting as a fluid outlet of said gas supply path structure group.

24. The excimer laser according to claim 14, further comprising vertical width adjusting means for adjusting a vertical width of said throat portion.

* * * * *

UNITED STATES PATENT AND TRADEMARK OFFICE
CERTIFICATE OF CORRECTION

PATENT NO. : 6,804,285 B2
DATED : October 12, 2004
INVENTOR(S) : Tadahiro Ohmi et al.

It is certified that error appears in the above-identified patent and that said Letters Patent is hereby corrected as shown below:

Title page,
Item [*] Notice, insert: -- This patent issued on a continued prosecution application filed under 37 CFR 1.53(d), and is subject to the twenty year patent term provisions of 35 U.S.C. 154(a)(2). --.

Column 1,
Line 20, "only which can" should read -- which can only --.

Column 8,
Line 20, "A$\gamma$v" should read -- A$\rho$v --;
Line 37, "throut" should read -- throat --; and
Line 47, "A$_{throut}$" should read -- A$_{throat}$ --.

Column 9,
Line 35, "speed of sound" should read -- Speed of sound --; and
Line 54, "of" (first occurrence) should read -- on --;

Column 12,
Line 42, "sound speed" should read -- speed of sound --;
Line 55, "of" (first occurrence) should read -- the --; and
Line 57, "better" should read -- best --.

Column 17,
Line 59, "not;" should be deleted.

Column 18,
Line 31, "wherein" should be deleted; and

UNITED STATES PATENT AND TRADEMARK OFFICE
CERTIFICATE OF CORRECTION

PATENT NO.    : 6,804,285 B2
DATED         : October 12, 2004
INVENTOR(S)   : Tadahiro Ohmi et al.

It is certified that error appears in the above-identified patent and that said Letters Patent is hereby corrected as shown below:

Column 18 (cont'd),
Line 43, "comprising" should read -- comprises --.

Signed and Sealed this

Third Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,804,285 B2  
DATED : October 12, 2004  
INVENTOR(S) : Tadahiro Ohmi et al.

It is certified that error appears in the above-identified patent and that said Letters Patent is hereby corrected as shown below:

Title page,  
Item [73], Assignee, change "Canon Kabushiki Kaisha, Tokyo (JP)" to read -- Cannon Kabushiki Kaisha, Tokyo (JP) and Tadahiro Ohmi, Sendai (JP) --.  
Item [*] Notice, insert: -- This patent issued on a continued prosecution application filed under 37 CFR 1.53(d), and is subject to the twenty year patent term provisions of 35 U.S.C. 154(a)(2). --.

Column 1,  
Line 20, "only which can" should read -- which can only --.

Column 8,  
Line 20, "$A\gamma v$" should read -- $A\rho v$ --;  
Line 37, "throut" should read -- throat --; and  
Line 47, "$A_{throut}$" should read -- $A_{throat}$ --.

Column 9,  
Line 35, "speed of sound" should read -- Speed of sound --; and  
Line 54, "of" (first occurrence) should read -- on --;

Column 12,  
Line 42, "sound speed" should read -- speed of sound --;  
Line 55, "of" (first occurrence) should read -- the --; and  
Line 57, "better" should read -- best --.

Column 17,  
Line 59, "not;" should be deleted.

Column 18,  
Line 31, "wherein" should be deleted; and

UNITED STATES PATENT AND TRADEMARK OFFICE
CERTIFICATE OF CORRECTION

PATENT NO.    : 6,804,285 B2
DATED         : October 12, 2004
INVENTOR(S)   : Tadahiro Ohmi et al.

It is certified that error appears in the above-identified patent and that said Letters Patent is hereby corrected as shown below:

Column 18 (cont'd),
Line 43, "comprising" should read -- comprises --.

Signed and Sealed this

Seventeenth Day of May, 2005

JON W. DUDAS
*Director of the United States Patent and Trademark Office*